Figure 1:
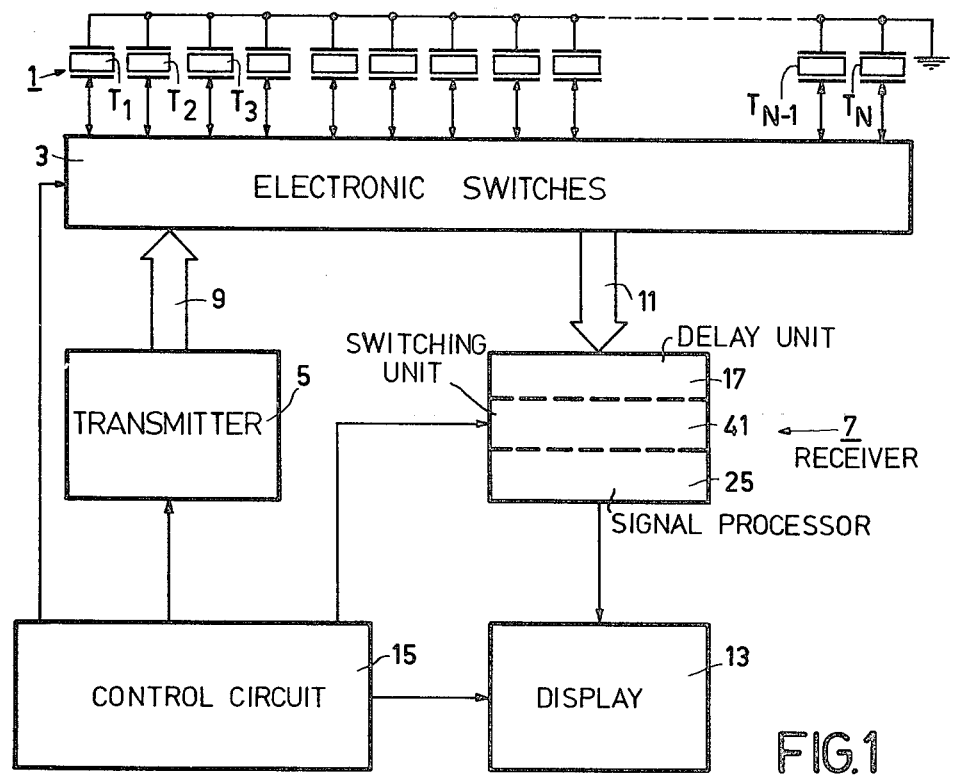

United States Patent [19]

Loonen

[11] 4,455,630

[45] Jun. 19, 1984

[54] DEVICE FOR FORMING AN IMAGE BY MEANS OF ULTRASOUND

[75] Inventor: Antonie R. M. Loonen, Eindhoven, Netherlands

[73] Assignee: U.S. Philips Corporation, New York, N.Y.

[21] Appl. No.: 318,645

[22] Filed: Nov. 5, 1981

[30] Foreign Application Priority Data

Dec. 11, 1980 [NL] Netherlands ............... 8006718

[51] Int. Cl.³ .................... G01S 15/06; G01S 7/54
[52] U.S. Cl. ........................... 367/103; 367/105; 367/122; 367/123
[58] Field of Search ............... 367/105, 122, 103, 123; 73/626

[56] References Cited

U.S. PATENT DOCUMENTS

| | | | |
|---|---|---|---|
| 4,005,382 | 1/1977 | Beaver | 367/105 |
| 4,088,979 | 5/1978 | Jones et al. | 367/905 X |
| 4,180,790 | 12/1979 | Thomas | 367/105 X |
| 4,215,584 | 8/1980 | Kuroda et al. | 367/105 X |
| 4,223,560 | 9/1980 | Glenn | 73/626 |
| 4,257,271 | 3/1981 | Glenn | 73/626 |
| 4,330,875 | 5/1982 | Tachita et al. | 367/105 |

*Primary Examiner*—Richard A. Farley
*Attorney, Agent, or Firm*—Jack E. Haken

[57] ABSTRACT

A device for forming an image of an object by means of ultrasound beams, comprising an array (1) of electro-acoustic transducers, means for connecting a selected group of transducers to a delay unit (17) which is arranged to delay the electric signal generated by each transducer of the group by a predetermined period of time and to sum the delayed signals in order to form a resultant signal which is an electrical representation of the acoustic signals originating from a selected distance or from a selected direction. The delay unit (17) is formed by a tapped delay line (19), whose taps (21) serve as inputs for the signals originating from the various transducers and whose output (23) is connected to a signal processing device (25) for the further processing of the resultant signal. Signals are applied to the taps through current sources. The applied signals may be selectively attenuated to effect apodization of the ultrasound beam.

3 Claims, 5 Drawing Figures

DEVICE FOR FORMING AN IMAGE BY MEANS OF ULTRASOUND

The invention relates to a device for forming an image of an object by means of untrasound, comprising an array of N electroacoustic transducers, each of which is arranged to generate an electrical signal when it receives an acoustic signal, means for connecting a selected group of M transducers (M≦N) to a delay unit which is arranged to delay the electrical signal generated by each transducer of the group by a predetermined period of time and to sum the delayed signals in order to form a resultant signal which is an electrical representation of the acoustic signals originating from a selected distance or from a selected direction.

A device of this kind is known, for example, from European Patent Application 0 015 130. Each transducer of the known device has associated with it one or two delay lines, the outputs of which are connected to a summing amplifier. By a suitable choice of the delays introduced by the various delay lines it can be achieved that the electrical signals which arrive at the summing amplifier with the same phase correspond to acoustic signals from a predetermined distance (focusing) or from a predetermined direction (beam steering). It is alternatively possible to carry out both focusing and beam steering.

If it is desired to change the focal distance and/or the beam direction during the formation of an image, as is usually the case, the delays of the delay lines must be changed. To achieve this, a complete series of delay lines can be provided for each focal distance and for each beam direction, together with a switching unit which switches on in succession the various series, or use can be made of delay lines having an adjustable delay. In the latter case a control unit must be provided for each delay unit. Both solutions are complex and expensive and the invention has for its object to provide a device of the kind set forth in which the delay unit is comparatively simple and inexpensive and in which it is very easy to change over to other delays.

To this end, the device in accordance with the invention is characterized in that the delay unit is formed by a tapped delay line whose taps serve as inputs for the signals originating from the various transducers and whose output is connected to a signal processing device for the further processing of the resultant signal.

In this case only one tapped delay line is required for each focal distance or for each beam direction; this represents a substantial simplification and saving.

In order to minimize the loading on the taps of the delay line, a preferred embodiment of the device in accordance with the invention is characterized in that the taps of the delay line are connected to the associated transducers via current source circuits.

Figure 2:
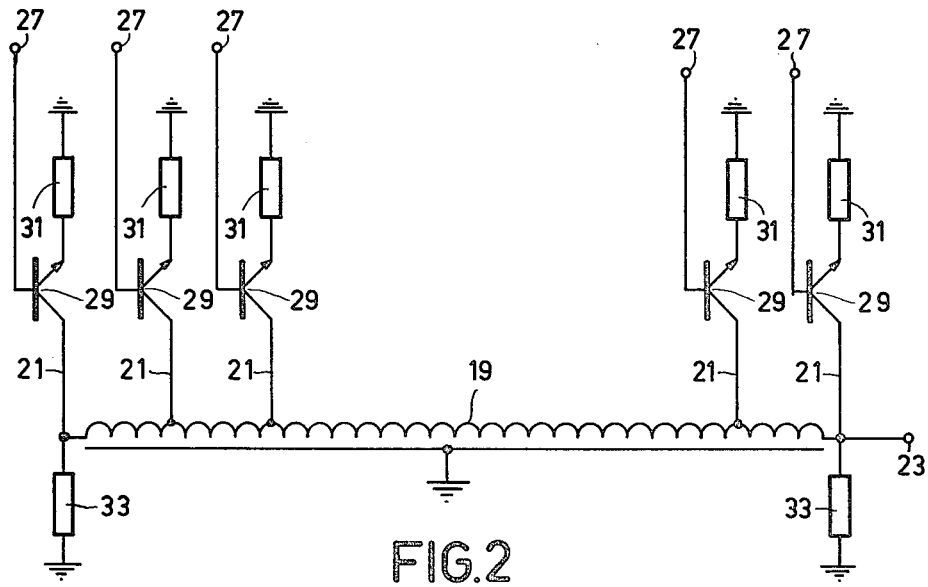
Figures 3, 4:
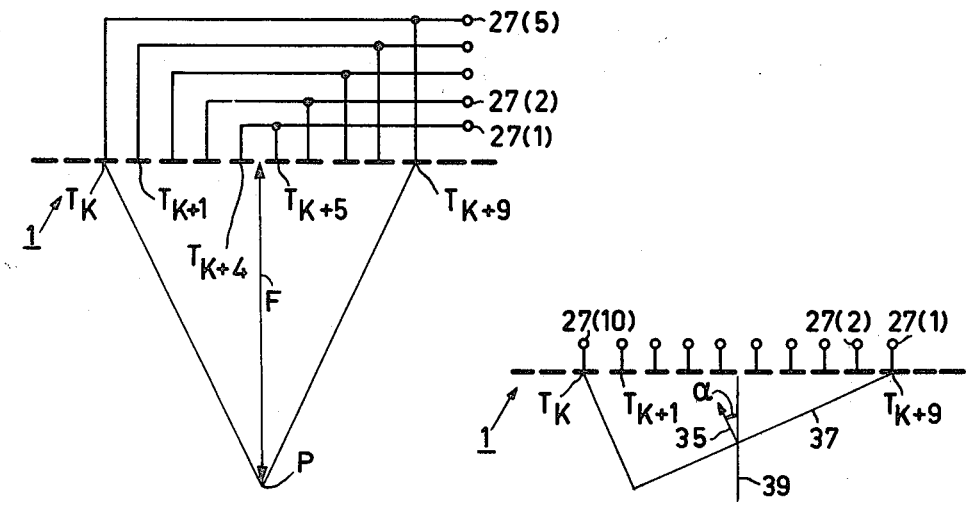
Figure 5:
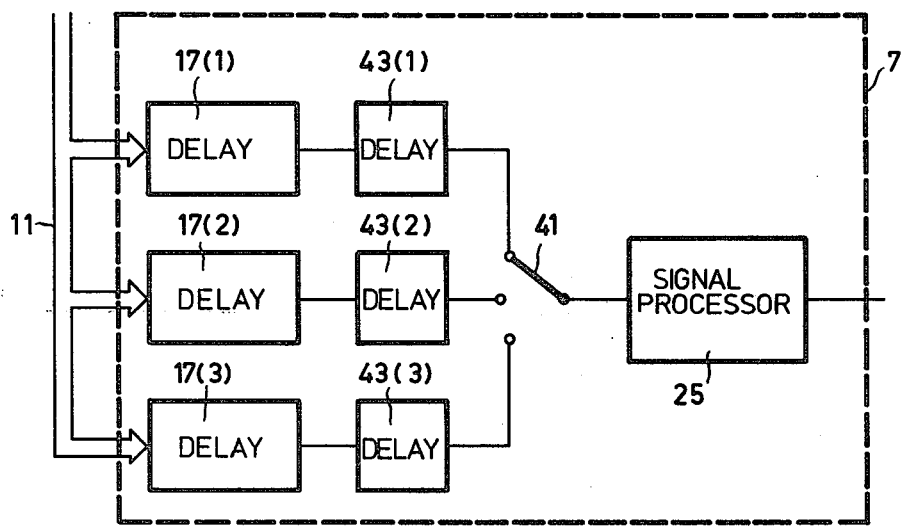

The invention will be described in detail hereinafter with reference to the accompanying diagrammatic drawing. Therein:

FIG. 1 is a block diagram of an embodiment of a device in accordance with the invention, FIG. 2 is a diagrammatic representation of a delay unit for the device shown in FIG. 1, FIG. 3 shows a diagram to illustrate the operation of a first version of the device shown in FIG. 1, FIG. 4 shows a diagram to illustrate the operation of a second version of the device shown in FIG. 1, and FIG. 5 is a block diagram of an embodiment of a receiver associated with the device shown in FIG. 1.

The device which is diagrammatically shown in FIG. 1 comprises an array 1 with a row of N electro-acoustic transducers $T_1, T_2, \ldots T_N$ which a made, for example, of piezoelectric material and each of which comprises two electrodes, one of which is grounded while the other is connected to a switching member 3 which comprises N electronic switches for the selective connection of a group of M transuducers to a transmitter 5 or a receiver 7. It is to be noted that M≦N. The value of M can be varied and during transmission it need not be the same as the value during reception. During transmission, high frequency electrical signals are applied from the transmitter 5 to the transducer via a bundle of leads 9 and the switching member 3. Each transducer converts such an electrical signal into an acoustic signal (ultrasound beam) which is transmitted to an object to be examined and which is reflected by discontinuities in said object. Some of the reflected signals (echos) are incident on the transducers again and are converted into electrical signals which are applied to the receiver 7 via a bundle of leads 11. The receiver 7 is also connected to a known display device 13 which comprises a display screen on which an image of the object to be examined, is displayed.

The cooperation between the switching member 3, the transmitter 5, the receiver 7 and the display device 13 which is necessary for the formation of an image, is controlled by a main control circuit 15.

The general construction of the various parts of the device shown in FIG. 1 is known per se (for example, see Netherlands Patent Application No. 7608280 laid open to public inspection). Therefore, hereinafter they will be described in detail only when necessary for a proper understanding of the present invention.

The receiver 7 comprises at least one delay unit 17 which is arranged to delay the electronic signal generated by each of the M transducers of the group by a predetermined period of time and to sum the delayed signals. Thus, a resultant signal is formed which is an electrical representation of acoustic signals received by the transducers. As has already been explained in, for example, said European Laid Open No. 0 015 130, a suitable choice of the delay for each electric signal enables the distance and/or the direction to be selected from which the echos represented by the resultant signal originate.

FIG. 2 shows diagrammatically an embodiment of a delay unit in accordance with the invention. The unit comprises a delay line 19 with taps 21 which serve as inputs for the signals originating from the various transducers. Inside the receiver 7, the output 23 of the delay line is connected to a signal processing device 25 (FIG. 1) for the further processing of the resultant signal. The signal processing device may comprise, for example, an amplifier or a memory circuit.

Between the inputs 27 of the delay unit which are connected to the bundle of leads 11, and the taps 21 there are connected current source circuits, each of which is formed by a transistor 29 with a resistor 31 in the emitter lead. The current source circuits offer the advantage that the loading of the taps of the delay line is substantially less than if the transducers were connected directly to these taps.

A further advantage consists in that the signals originating from the various transducers can be selectively amplified or attenuated with respect to each other by a suitable choice of the values of the resistors 31, so that undesirable sidelobes are suppressed by apodization of the transducer radiation pattern.

The delay line 19 of the described embodiment is an electromagnetic delay line which is terminated at its beginning and its end by means of resistors 33. However, other tapped delay lines can alternatively be used.

The delay of a signal is greater as the tap to which the relevant signal is applied is situated further from the output 23. The distribution of the M transducers among the taps thus depends on the result to be achieved by means of the delay unit.

This will be illustrated with reference to the FIGS. 3 and 4.

FIG. 3 shows diagrammatically a part of the array 1, a group of 10 tranducers $T_K \ldots T_{K+9}$ being connected to the delay unit (M=10). The aim is to select echos which originate from a small region around a predetermined point P at a distance F (focal distance) from the array. The acoustic waves travelling from the point P to the extreme transducers $T_K$ and $T_{K+9}$ travel the longest distance so that they arrive later than the acoustic waves travelling to the transudcers situated further inwards. In order to bring all signals into phase with each other again, the signals from the central transducers $T_{K+4}$ and $T_{K+5}$ must be delayed more than those from the transducers situated further outwards. FIG. 3 shows that to achieve this the transducers $T_{K+4}$ and $T_{K+5}$ are connected to the first input 27 (1) of the delay line 19 (the extreme left-hand tap in FIG. 2) and that the transducers which are situated further outwards are connected to respectively further taps, so that the outermost transducers are connected to the fifth (extreme right-hand) input 27 (5). The focal distance F is determined by the overall delay present between the first and the last of the inputs used.

FIG. 4 shows diagrammatically a part of the array 1 with 10 selected transducers $T_K \ldots T_{K+9}$. In this case the aim is to select echos which originate from a given direction, that is to say only those echos having a direction 35 along which the wave front 37 propagates and which is inclined at a predetermined angle $\alpha$ with respect to the normal 39 to the array 1. It will be apparent from the Figure that the acoustic waves arriving at the extreme left-hand transducer $T_K$ will have travelled the longest distance and that those arriving at the extreme right-hand transducer $T_{K+9}$ will have travelled the shortest distance. In order to bring all signals into phase again, the delay should increase linearly from left to right, namely from the transducer $T_K$ in the direction of the transducer $T_{K+9}$. To achieve this, the transducer $T_K$ is connected to the extreme right-hand input 27 (10) and all subsequent transducers are connected to a tap situated further to the left as far as the transducer $T_{K+9}$, which is connected to the extreme left-hand input 27 (1). The value of $\alpha$ again depends on the overall delay between the first and the last of the taps used.

It will be apparent from the foregoing that for each focal distance F a separate delay unit 17 will be required. For a given number of different beam directions $\alpha$, however, a smaller number of delay units will suffice. This is because one and the same delay unit can be used for two beams, the directions 35 of which are inclined at the same angle with respect to the normal 39, but such that the first beam would approach the array 1 from below and from the right (FIG. 4) whilst the other beam would approach from below and from the left. It will suffice that the delay unit be connected inversely to the transducers in the second case, so that in the example of FIG. 4: $T_K$ would be connected to input 27 (1), $T_{K+1}$ to 27 (2), etc.

In order to enable images to be formed quickly and easily with different focal distances and different beam directions, the receiver 7 comprises a, preferably electronic, switching unit 41 which is arranged to switch on the different delay units in succession. This will be described in detail with reference to FIG. 5. This FIGURE shows a receiver 7 which comprises three delay units 17 (1), 17 (2) and 17 (3) which are arranged to select echo signals with different focal distances $F_1$, $F_2$ and $F_3$, respectively. These delay units are followed by fixed delay lines 43 (1), 43 (2) and 43 (3), respectively. The delays thereof are chosen so that the overall delay for signals passing through a delay unit 17 and the associated fixed delay line 43, is always the same.

The switching unit 41 selects one of the fixed delay lines 43 for connection to the signal processing device 25. In order to avoid annoying interference in the image due to switching, the switching unit 41 is arranged so that switchover takes place comparatively slowly, so that only low frequency interference is introduced. The signal processing device 25 preferably comprises a suitable filter for suppressing such low frequency interference.

The receiver 7 of the embodiment shown in FIG. 5 comprises three delay units 17 which are suitable for focusing. Obviously, it is alternatively possible to use a different number of such units and/or a desirable number of delay units adapted for beam steering.

As in the embodiments described with reference to the FIGS. 3 and 4, the array 1 may comprise a number of transducers in a straight line, but other geometries are alternatively possible, for example, a number of transducers in a curved line or a disc-like array with transducers in the form of concentric rings.

The transmitter 5 (FIG. 1) may also comprise one or more tapped delay lines 19 in accordance with FIG. 2 for the selective delay of the transmission pulses applied to the transducers in order to focus and/or direct the transmitted beams.

What is claimed is:
1. In a device for forming an image of an object by use of ultrasound energy, of the type which comprises an array of electroacoustic transducers; a tapped delay line having a plurality of taps, which serve as inputs for signals originating from the various transducers, and an output; first switching means which selectively connect one or more of the transducers to each of a plurality of the taps to effect focusing and/or steering of an ultrasound beam which is received by the transducers; and signal processing and display means, connected to the output of the delay line, which produce and display an image of an object which reflects ultrasound echoes to the transducers; the improvement which comprises;
   a plurality of current source circuits, each current source circuit having an output connected to an associated tap of the delay line and an input connected to the first switching means for receipt of the signals from the transducers, whereby the load presented to the delay line by the transducers is effectively reduced.
2. A device as claimed in claim 1 wherein each current source comprises a transistor having a base connected to the associated transducers, a collecter connected to the associated tap of the delay line, and an emitter; and further comprising a plurality of resistors each resistor being connected between the emitter of an associated transistor and a reference potential level, the values of the resistors being chosen to achieve apodization of the ultrasound beam pattern which is received by the transducers and to thus reduce side lobes.

3. A device as claimed in claim 1 or 2 comprising a plurality of said tapped delay lines;

second switching means which sucessively functionally connect different delay lines between the first switching means and the signal processing and display means to effect a progressive change in focusing and/or beam steering pattern of the device; and a plurality of fixed delay means, each fixed delay means being connected in series between an associated tapped delay line and the second switching means and having a delay time which is chosen so that the overall delay of each fixed delay means and the associated tapped delay line is equal to the overall delays of the other fixed delay-tapped delay line pairs.

* * * * *